US012686114B2

(12) United States Patent
Tanaami et al.

(10) Patent No.: US 12,686,114 B2
(45) Date of Patent: Jul. 21, 2026

(54) ROBOT SYSTEM, CONTROLLER, AND METHOD FOR CONTROLLING ROBOT SYSTEM

(71) Applicant: SINTOKOGIO, LTD., Nagoya (JP)

(72) Inventors: Yoshikane Tanaami, Nagoya (JP); Miyuki Hayashi, Nagoya (JP); Shotaro Mamiya, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 128 days.

(21) Appl. No.: 18/756,108

(22) Filed: Jun. 27, 2024

(65) Prior Publication Data

US 2025/0033191 A1    Jan. 30, 2025

(30) Foreign Application Priority Data

Jul. 25, 2023    (JP) ................................. 2023-121020

(51) Int. Cl.
| | |
|---|---|
| *B25J 13/06* | (2006.01) |
| *B25J 3/04* | (2006.01) |
| *B25J 9/00* | (2006.01) |
| *B25J 9/16* | (2006.01) |
| *B25J 13/08* | (2006.01) |
| *B25J 19/02* | (2006.01) |

(52) U.S. Cl.
CPC ........... *B25J 9/0081* (2013.01); *B25J 13/082* (2013.01); *B25J 13/085* (2013.01); *B25J 13/088* (2013.01); *B25J 19/023* (2013.01)

(58) Field of Classification Search
CPC ...... B25J 9/0081; B25J 13/082; B25J 13/085; B25J 13/088; B25J 19/023; B25J 3/04; B25J 9/1602; B25J 9/1697; B25J 13/06; B25J 19/02
See application file for complete search history.

(56) References Cited

U.S. PATENT DOCUMENTS

| | | | | |
|---|---|---|---|---|
| 2016/0354925 A1* | 12/2016 | Shimodaira | ............ | B25J 9/1633 |
| 2018/0043540 A1* | 2/2018 | Satou | ..................... | B25J 9/1633 |
| 2020/0198120 A1* | 6/2020 | Hashimoto | .............. | B25J 19/02 |
| 2022/0063095 A1* | 3/2022 | Kamon | .................. | B25J 13/085 |
| 2022/0134571 A1* | 5/2022 | Takeuchi | .............. | B25J 9/1694 |
| | | | | 700/259 |
| 2022/0388160 A1 | 12/2022 | Yonemoto et al. | | |

FOREIGN PATENT DOCUMENTS

WO        2021095886 A1      5/2021

* cited by examiner

*Primary Examiner* — Adam R Mott
*Assistant Examiner* — Heather J Keniry
(74) *Attorney, Agent, or Firm* — Harness, Dickey & Pierce, P.L.C.

(57)        ABSTRACT

Achieved is a robot system that enables a worker and the like to grasp, as data, a force actually acting on a target. A robot system includes a master robot, a slave robot, a force sensor, a display, and a controller, the controller being configured to carry out a display process of, on the display, displaying force data indicative of a reaction force which has been detected by the force sensor.

6 Claims, 8 Drawing Sheets

FIG. 2

ROBOT SYSTEM, CONTROLLER, AND METHOD FOR CONTROLLING ROBOT SYSTEM

This Nonprovisional application claims priority under 35 U.S.C. § 119 on Patent Application No. 2023-121020 filed in Japan on Jul. 25, 2023, the entire contents of which are hereby incorporated by reference.

TECHNICAL FIELD

The present disclosure relates to a robot system, a controller, and a method for controlling a robot system.

BACKGROUND ART

Conventionally, technologies have been known which are configured to feed back to workers remotely operating robots a sense of force and/or a sense of touch which occur when the robots touches targets. For example, Patent Literature 1 discloses a grinding processing robot which is remotely operated by an operation device. A robot arm is provided with a force sensor configured to detect a force and a moment which are received from a target to be grinded. The force and the moment which have been detected by the force sensor are fed back to the operation device, thus enabling a worker operating the operation device to feel a force, such as a reaction force, which is generated at the robot arm in operation.

CITATION LIST

Patent Literature

[Patent Literature 1]
International Publication No. WO 2021/095886

SUMMARY OF INVENTION

Technical Problem

Unfortunately, in a robot as disclosed in Patent Literature 1, the force and the moment detected by the force sensor are fed back to a gripping part of an operation device which is gripped by the worker. Thus, the worker can only grasp a state of the robot arm through a sensation of a hand of the worker. Therefore, there is a problem that the worker can estimate a force that would act on the target from the robot arm but cannot grasp a force that actually acts on the target.

It is an object of an aspect of the present disclosure to achieve a robot system that enables a worker and the like to grasp, as data, a force actually acting on a target.

Solution to Problem

In order to solve the foregoing problem, a robot system in accordance with an aspect of the present disclosure includes: a master robot including a first link mechanism and a first tool that is coupled to the first link mechanism and that is operated by a worker; a slave robot including a second link mechanism that operates mutually in synchronization with the first link mechanism and a second tool that is coupled to the second link mechanism and that is driven by the second link mechanism; a force sensor that detects a reaction force of a force acting on a target from the second tool; a display; and a controller, the controller being configured to carry out a display process of, on the display, displaying force data indicative of the reaction force which has been detected by the force sensor.

In order to solve the foregoing problem, a controller in accordance with an aspect of the present disclosure is a controller configured to control a robot system including: a master robot including a first link mechanism and a first tool that is coupled to the first link mechanism and that is operated by a worker; a slave robot including a second link mechanism that operates mutually in synchronization with the first link mechanism and a second tool that is coupled to the second link mechanism and that is driven by the second link mechanism; a force sensor that detects a reaction force of a force acting on a target from the second tool; and a display, the controller being configured to carry out a display process of, on the display, displaying force data indicative of the reaction force which has been detected by the force sensor.

In order to solve the foregoing problem, a method for controlling a robot system in accordance with an aspect of the present disclosure is a method for controlling a robot system including: a master robot including a first link mechanism and a first tool that is coupled to the first link mechanism and that is operated by a worker; a slave robot including a second link mechanism that operates mutually in synchronization with the first link mechanism and a second tool that is coupled to the second link mechanism and that is driven by the second link mechanism; a force sensor that detects a reaction force of a force acting on a target from the second tool; and a display, the method including carrying out a display process of, on the display, displaying force data indicative of the reaction force which has been detected by the force sensor.

Advantageous Effects of Invention

According to an aspect of the present disclosure, it is possible to achieve a robot system that enables a worker and the like to grasp, as data, a force actually acting on a target.

BRIEF DESCRIPTION OF DRAWINGS

FIG. 2 is a schematic view illustrating a configuration of a fixing part illustrated in FIG. 1.

DESCRIPTION OF EMBODIMENTS

Embodiment 1

Figure 1:
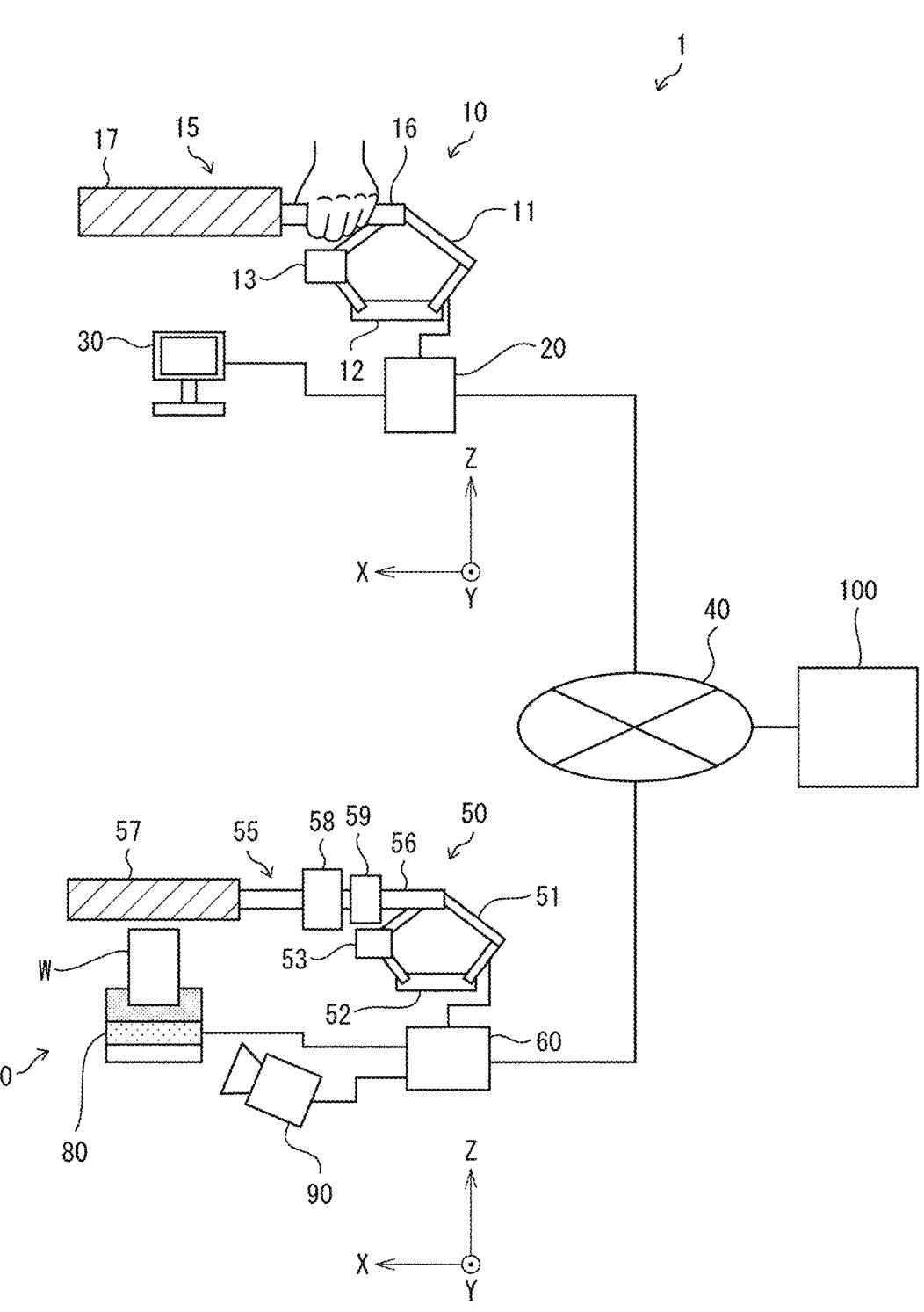
FIG. 1 is a diagrammatic view illustrating an example of a robot system in accordance with Embodiment 1 of the present disclosure.

With reference to FIGS. 1 to 6, the following description will discuss an embodiment of the present disclosure in detail. Note that, for simplification of descriptions, coordinate axes having three directions, which are an X axis, a Y axis, and a Z axis, are defined as illustrated in FIG. 1 and the like. The coordinate axes are set with a worker operating a master robot 10 as the reference. In the drawings, an X-axis direction is a front-and-rear direction, a Y-axis direction is a left-and-right direction, and a Z-axis direction is an up-and-down direction. In FIG. 1 and the like, an X-axis positive direction is a front direction, a Y-axis positive direction is a left direction, and a Z-axis positive direction is an up direction.

(Outline of Robot System)

FIG. 1 is a diagrammatic view illustrating an example of a robot system 1 in accordance with Embodiment 1 of the present disclosure. The robot system 1 shown in FIG. 1 as an example is a robot system configured to carry out a process of filing a target W. The robot system 1 includes a master robot 10, a slave robot 50, a display 30, a force sensor 80, and a controller 100.

The robot system 1 is a system which is controlled by the controller 100 in an integrated manner and which remotely operates the slave robot 50 with use of the master robot 10. The controller 100 is connected with the master controller 20 and the slave controller 60 via a network 40 so that information communication can be carried out. The controller 100 transmits a command signal to the master controller 20 and the slave controller 60 to control the master robot 10 and the slave robot 50.

The master robot 10 is a robot that is operated by a worker. The master robot 10 includes a first link mechanism 11 and a first tool 15. The first link mechanism 11 is a link mechanism that enables the first tool 15 to move in the X-axis direction and the Z-axis direction. The first link mechanism 11 is attached to a base 12 fixed onto a floor surface or a work stage. The first link mechanism 11 illustrated in FIG. 1 is a parallel link mechanism. Note that as the first link mechanism 11, a link mechanism may be employed which enables the first tool 15 to move in the Y-axis direction.

The first link mechanism 11 includes a first actuator 14 configured to supply a driving force to the first link mechanism 11. The first actuator 14 is driven on the basis of a command signal from the master controller 20 described later. The first actuator 14 is, for example, an electric motor.

The first actuator 14 may include a first encoder (not illustrated) configured to detect a rotation angle of an output shaft of the first actuator 14 and a first angle sensor (not illustrated) configured to read a scale of the first encoder. The first encoder may be attached to the output shaft of the first actuator 14. The first actuator 14 may transmit an output signal indicative of a rotation angle of the output shaft of the first actuator 14 which has been detected by the first angle sensor, to the controller 100 via the master controller 20. The controller 100 may detect positional information of the first tool 15 on the basis of the rotation angle of the output shaft of the first actuator 14. In addition, the controller 100 may control operation of the first actuator 14 on the basis of the rotation angle of the output shaft of the first actuator 14.

The first tool 15 is a tool that is coupled to the first link mechanism 11 and that is operated by the worker. The first tool 15 includes a first gripping part 16 and a first processing head 17. The first gripping part 16 is a portion to be gripped by the worker. On the first processing head 17, a file that enables a filing process is formed. The first processing head 17 is a dummy processing head, not a head that actually processes the target W. The worker grips the first gripping part 16 to operate the first tool 15. When the worker operates the first tool 15, the first link mechanism 11 operates, thereby causing the first tool 15 to move in the X-axis direction and/or the Z-axis direction. That is, the first processing head 17 moves in the X-axis direction and/or the Z-axis direction.

The first link mechanism 11 may include a first parallel link mechanism 13. The first parallel link mechanism 13 is a mechanism configured to maintain a constant posture of the first processing head 17 of the first tool 15. More specifically, the first parallel link mechanism 13 is a mechanism configured to cause the posture of the first processing head 17 to be constant so that a surface of the first processing head 17 on which a file is formed is horizontal.

The display 30 is provided in a position that enables the worker operating the first tool 15 to view data displayed on the display 30. On the display 30, various information is displayed. Further, a plurality of displays 30 may be provided. For example, a display 30 different from a display 30 that the worker can view may be provided in a position that enables a third person other than the worker operating the first tool 15 to view the different display 30.

The slave robot 50 is a robot configured to actually process the target W. The configuration of the slave robot 50 is substantially identical with that of the master robot 10. The slave robot 50 includes a second link mechanism 51 and a second tool 55. The second link mechanism 51 is a link mechanism that enables the second tool 55 to move in the X-axis direction and the Z-axis direction. The second link mechanism 51 is attached to a base 52 fixed onto a floor surface or a work stage. The second link mechanism 51 illustrated in FIG. 1 is a parallel link mechanism. Note that as the second link mechanism 51, a link mechanism may be employed which enables the second tool 55 to move in the Y-axis direction.

The second link mechanism 51 includes a second actuator 54 configured to supply a driving force to the second link mechanism 51. The second actuator 54 is driven on the basis of a command signal from the slave controller 60 described later. The second actuator 54 is, for example, an electric motor.

The second actuator 54 may include a second encoder (not illustrated) configured to detect a rotation angle of an output shaft of the second actuator 54 and a second angle sensor (not illustrated) configured to read a scale of the second encoder. The second encoder may be attached to the output shaft of the second actuator 54. The second actuator 54 may transmit an output signal indicative of a rotation angle of the output shaft of the second actuator 54 which has been detected by the second angle sensor, to the controller 100 via the slave controller 60. The controller 100 may detect positional information of the second tool 55 on the basis of the rotation angle of the output shaft of the second actuator 54. In addition, the controller 100 may control operation of the second actuator 54 on the basis of the rotation angle of the output shaft of the second actuator 54.

The second tool 55 is a tool that is coupled to the second link mechanism 51 and that actually processes the target W. The second tool 55 includes a second gripping part 56 and a second processing head 57. The second gripping part 56 is a dummy gripping part, not a gripping part to be actually gripped by the worker. On the second processing head 57, a file that subjects the target W to a filing process is formed. The second processing head 57 is a head that actually processes the target W. The second tool 55 is driven by the second link mechanism 51. The second link mechanism 51 operates in synchronization with the first link mechanism 11, so that the second tool 55 moves in the X-axis direction and the Z-axis direction. That is, the second processing head 57 moves in the X-axis direction and/or the Z-axis direction.

The second link mechanism 51 may include a second parallel link mechanism 53. The second parallel link mechanism 53 is a mechanism configured to maintain a constant posture of the second processing head 57 of the second tool 55. More specifically, the second parallel link mechanism 53 is a mechanism configured to cause the posture of the second processing head 57 to be constant so that a surface of the second processing head 57 on which a file is formed is horizontal.

Figure 2:
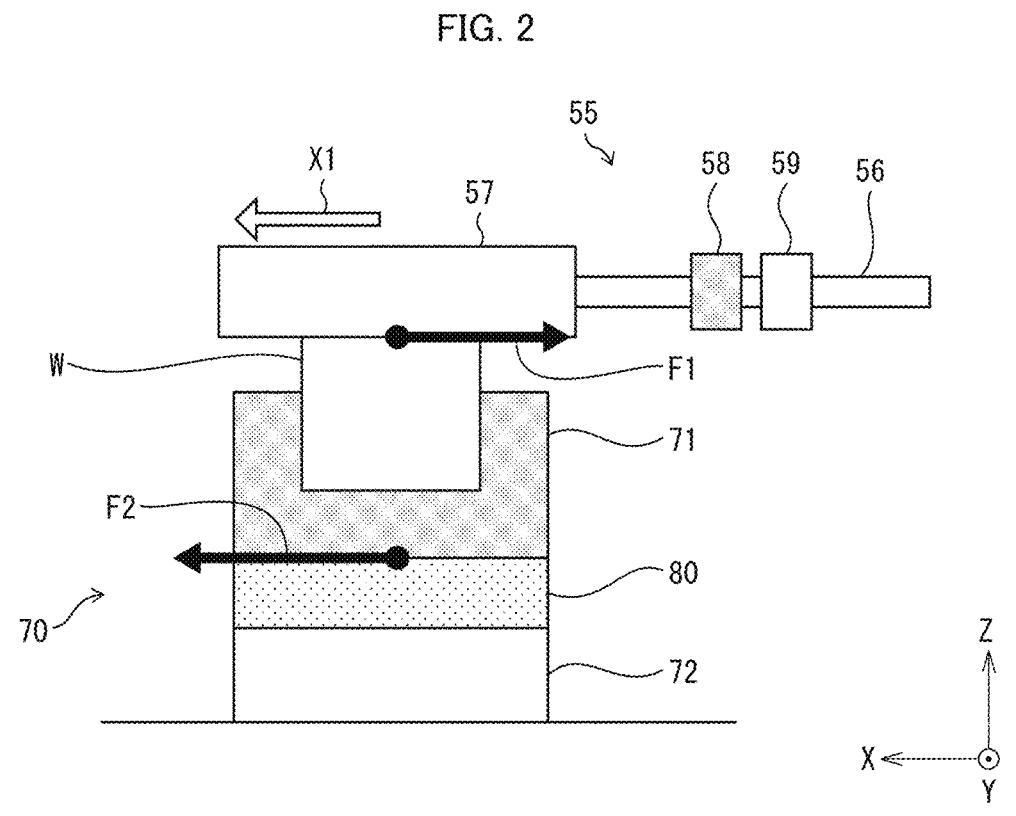
Figure 3:
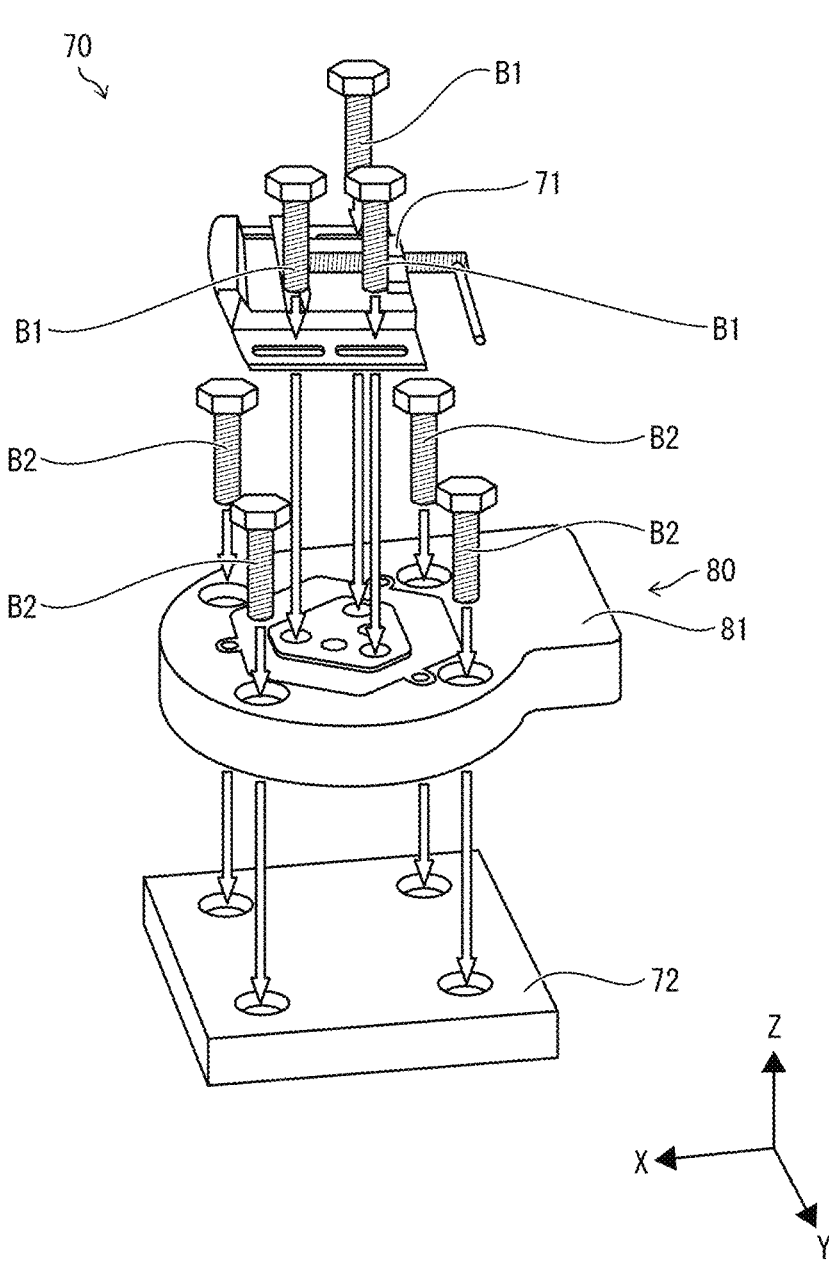
FIG. 3 is an exploded perspective view illustrating a configuration of the fixing part illustrated in FIG. 1.

The robot system 1 may include a fixing part 70. The target W to be processed by the second tool 55 is fixed onto the floor surface or the work stage by the fixing part 70. With reference to FIG. 2 and FIG. 3, the following description will discuss the fixing part 70 in detail. FIG. 2 is a schematic view illustrating a configuration of the fixing part 70 illustrated in FIG. 1. FIG. 3 is an exploded perspective view illustrating a configuration of the fixing part 70 illustrated in FIG. 1.

As illustrated in FIG. 2, the fixing part 70 includes a vise 71 and the force sensor 80. The target W is held by the vise 71 therebetween to be fixed onto the floor surface or the work stage. The vise 71 is provided on the force sensor 80. As illustrated in FIG. 3, the vise 71 may be attached on the force sensor 80 with use of bolts B1. The force sensor 80 is provided on an attachment 72 and is fixed onto the floor surface or the work stage with use of the attachment 72. The force sensor 80 may be attached on the attachment 72 with use of bolts B2.

Figure 4:
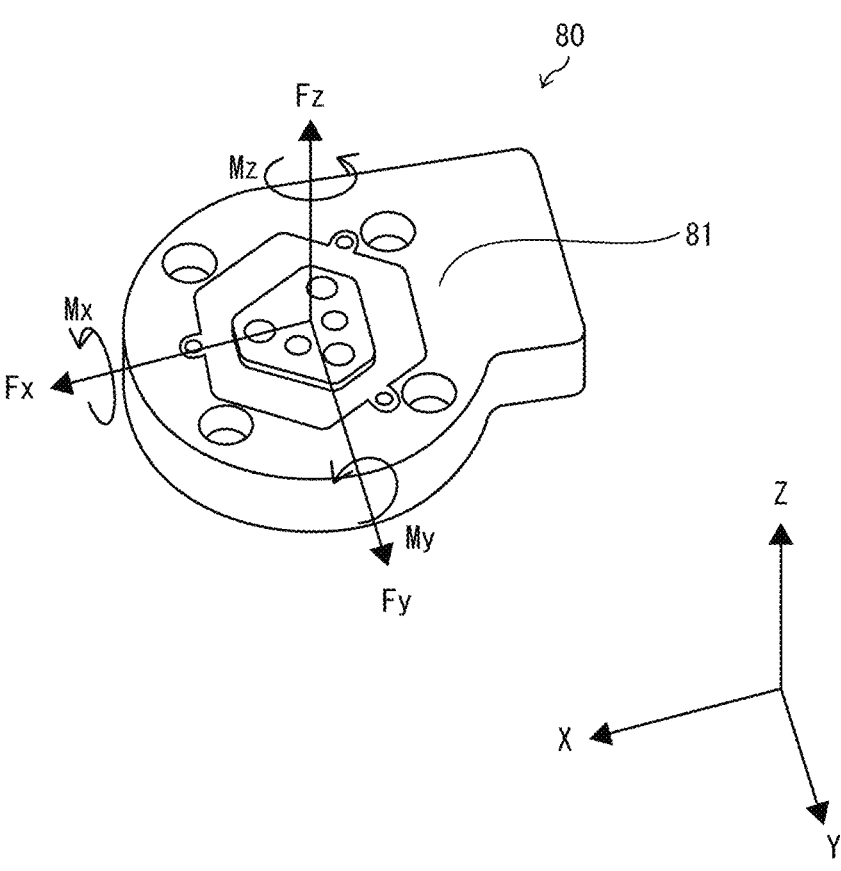
FIG. 4 is a view for explaining parameters detected by a force sensor included in the fixing part.

With reference to FIG. 4, the following description will discuss parameters detected by the force sensor 80 included in the fixing part 70. FIG. 4 is a view for explaining the parameters detected by the force sensor 80 included in the fixing part 70. As illustrated in FIG. 4, the force sensor 80 is a six-axis force sensor that is configured to detect loads in the X-axis direction, in the Y-axis direction, and in the Z-axis direction (Fx, Fy, Fz) and is, at the same time, capable of detecting moments about the X-axis direction, about the Y-axis direction, and about the Z-axis direction (Mx, My, Mz). The force sensor 80 is a strain gauge sensor including a strain element (not illustrated). The vise 71 is attached to a first surface 81 of the force sensor 80, and the attachment 72 is attached to a second surface opposite to the first surface 81. Note that the force sensor 80 is not limited to a strain gauge sensor, and, for example, a piezoelectric or optical force sensor may be used.

The force sensor 80 detects a reaction force of a force acting on the target W from the second tool 55 and a moment of the force. For example, as illustrated in FIG. 2, when the second tool 55 moves in a direction of the arrow X1 with the second processing head 57 abutting on the target W, a frictional force F1 acts between the second processing head 57 and the target W. The force sensor 80 detects, via the vise 71, a reaction force F2 of the frictional force F1 acting on the target W. The force sensor 80 transmits, to the slave controller 60, an output signal indicative of values of the reaction force and the moment which have been detected.

According to the configuration in which the fixing part 70 includes the force sensor 80, the reaction force and the moment of the force acting on the target W from the second tool 55 are transferred to the vise 71 of the fixing part 70. The force sensor 80 can detect the reaction force and the moment that have been transferred to the vise 71. The force sensor 80 can, when provided on a fixing part 70 side, more accurately detect the reaction force and the moment of the force acting on the target W than when provided on a second tool 55 side. This makes it possible to accurately detect the reaction force of the force acting on the target W from the second tool 55. Note that it is only required that the force sensor 80 can at least detect a reaction force of the force acting on the target W in the X-axis direction.

The robot system 1 may include an angular velocity sensor 58 that detects an angular velocity of the second tool 55. The angular velocity sensor 58 is provided to the second tool 55. More specifically, the angular velocity sensor 58 is provided at the gripping part of the second tool 55. The angular velocity sensor 58 transmits, to the slave controller 60, an output signal indicative of an angular velocity which has been detected.

The robot system 1 may include an acceleration sensor 59 that detects an acceleration of the second tool 55. The acceleration sensor 59 is provided to the second tool 55. More specifically, the acceleration sensor 59 is provided at the gripping part of the second tool 55. The acceleration sensor 59 transmits, to the slave controller 60, an output signal indicative of an acceleration which has been detected.

The robot system 1 may include a camera 90 that images a processed state of the target W. The camera 90 transmits, to the slave controller 60, an output signal indicative of image data which has been captured. Note that the image captured by the camera 90 may be a still image or may be a moving image.

(Internal Configuration of Robot System)

Figure 5:
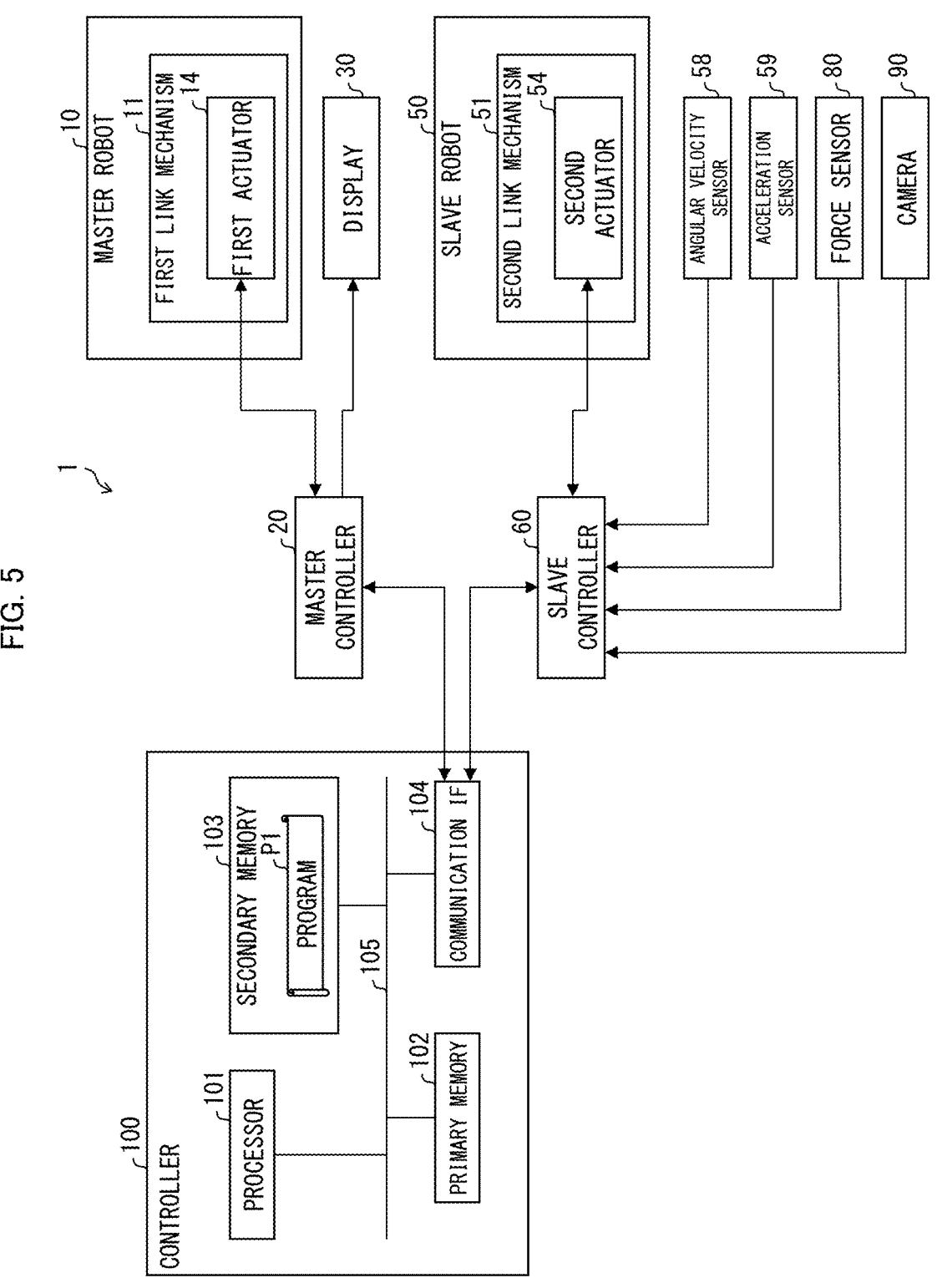
FIG. 5 is a block diagram illustrating internal configurations of components included in the robot system in accordance with Embodiment 1 of the present disclosure.

With reference to FIG. 5, the following description will discuss internal configurations of the components included in the robot system 1. FIG. 5 is a block diagram illustrating the internal configurations of the components included in the robot system 1. The controller 100 includes a processor 101, a primary memory 102, a secondary memory 103, a communication IF 104, and a bus 105. The processor 101, the primary memory 102, the secondary memory 103, and the communication IF 104 are connected with each other via the bus 105. Examples of a device usable as the controller 100 include a workstation constituting a cloud server.

The secondary memory 103 stores a control program P1. The processor 101 loads, on the primary memory 102, the control program P1 stored in the secondary memory 103. The processor 101 then carries out processes included in a control method S1 (described later) in accordance with instructions included in the control program P1 loaded on the primary memory 102. Examples of a device usable as the processor 101 include a central processing unit (CPU). Examples of a device usable as the primary memory 102 include a semiconductor random access memory (RAM). Examples of a device usable as the secondary memory 103 include a hard disk drive (HDD).

The communication IF 104 is an interface for communicating with the master controller 20 and the slave controller 60 via the network 40. Examples of an interface usable as the communication IF 104 include an Ethernet (registered trademark) interface. Examples of the network 40 which can be used include a personal area network (PAN), a local area network (LAN), a campus area network (CAN), a metropolitan area network (MAN), a wide area network (WAN), a global area network (GAN), and an internetwork containing a combination thereof. The internetwork may be an intranet, or may be an extranet, or may be the Internet.

It should be noted that the control program P1 may be stored in a computer-readable non-transitory tangible storage medium. This storage medium may be the secondary memory 103 or another storage medium. For example, a tape, a disk, a card, a semiconductor memory, a programmable logic circuit, or the like can be used as said another storage medium.

The present embodiment employs a configuration in which a single processor (processor 101) is used to carry out the control method S1. However, the present disclosure is not limited to this configuration. That is, a configuration in which a plurality of processors are used to carry out the control method S1 may be employed. In such a case, the plurality of processors for carrying out the control method S1 may be provided in a single computer and be configured to be communicable with each other via a bus or may be dispersedly provided in a plurality of computers and be configured to be communicable with each other via the network 40. For example, the following alternative aspect is also possible: an aspect in which processors included in the respective computers constituting a cloud server work together to carry out the control method S1.

The master controller 20 mainly controls the master robot 10. The master controller 20 is a device including a processor, a memory, a communication IF, and an input/output IF. Examples of a device usable as the master controller 20 include a personal computer (PC) and a programmable logic controller (PLC). The processor of the master controller 20 mainly carries out processes related to control of operation of the master robot 10 in accordance with instructions included in a control program stored in the memory.

To the master controller 20, the first actuator 14 of the first link mechanism 11 is connected. The master controller 20 transmits a control signal to the first actuator 14 in accordance with a command signal acquired from the controller 100. Further, the master controller 20 acquires information transmitted from the first actuator 14 and transmits, to the controller 100, the information acquired from the first actuator 14.

The master controller 20 is connected with the display 30 so that information communication can be carried out. The master controller 20 causes the display to display the information acquired from the controller 100, in accordance with the command signal acquired from the controller 100.

The slave controller 60 mainly controls the slave robot 50. The slave controller 60 is a device including a processor, a memory, a communication IF, and an input/output IF. Examples of a device usable as the slave controller 60 include a personal computer (PC) and a programmable logic controller (PLC). The processor of the slave controller 60 mainly carries out processes related to control of operation of the slave robot 50 in accordance with instructions included in a control program stored in the memory.

To the slave controller 60, the second actuator 54 of the second link mechanism 51 is connected. The slave controller 60 transmits a control signal to the second actuator 54 in accordance with a command signal acquired from the controller 100. Further, the slave controller 60 acquires information transmitted from the second actuator 54 and transmits, to the controller 100, the information acquired from the second actuator 54.

The slave controller 60 is connected with the force sensor 80 so that information communication can be carried out. The slave controller 60 transmits, to the controller 100, the parameter(s) acquired from the force sensor 80. Further, the slave controller 60 may be connected with the angular velocity sensor 58, the acceleration sensor 59, and the camera 90 so that information communication can be carried out. The slave controller 60 may transmit, to the controller 100, signals acquired from the angular velocity sensor 58, the acceleration sensor 59, and the camera 90.

(Flow of Control Method)

Figure 6:
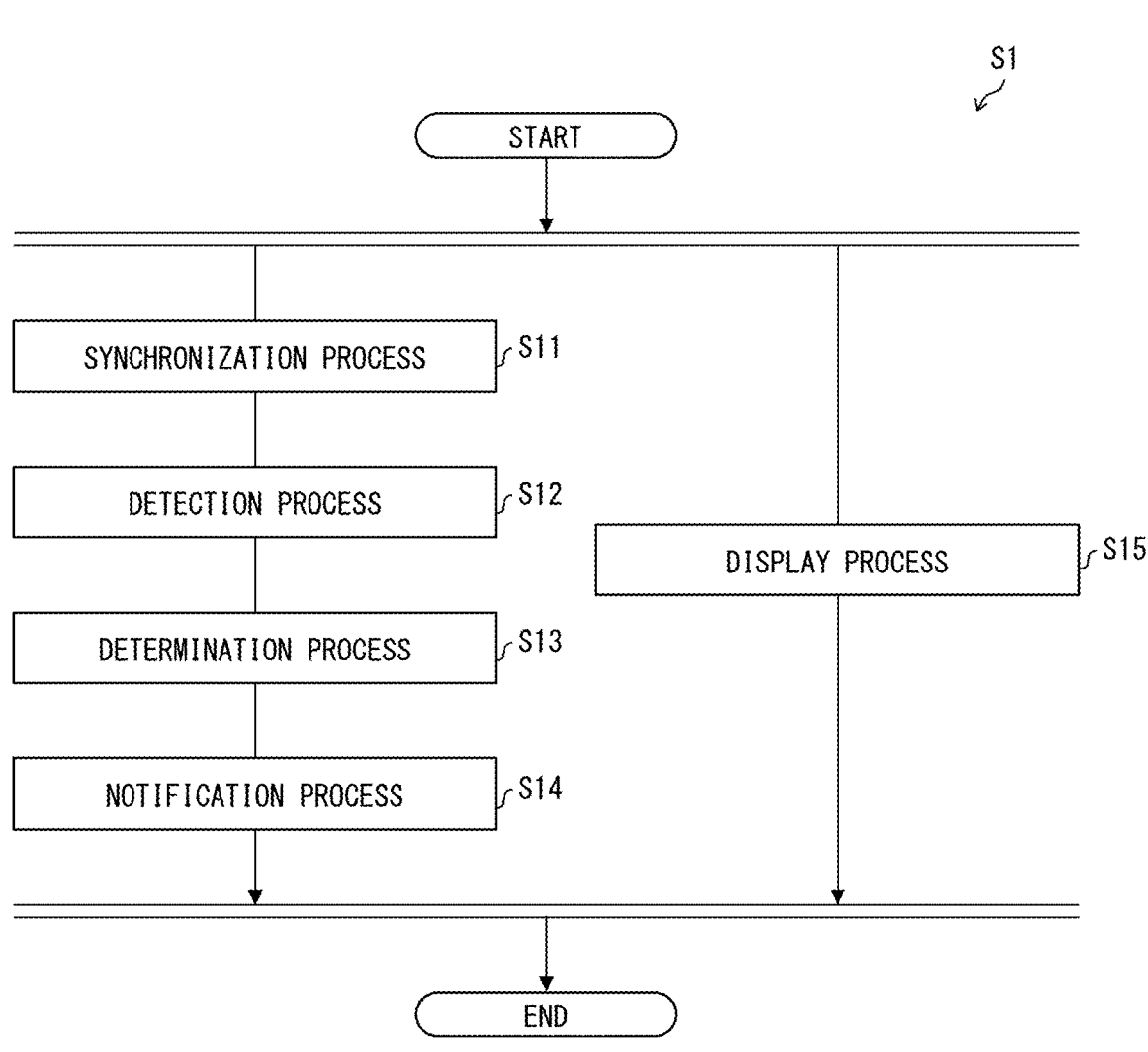
FIG. 6 is a flowchart illustrating a flow of a control method performed by a controller illustrated in FIG. 5.

With reference to FIG. 6, the following description will discuss a flow of the control method S1 for the robot system 1 which is carried out by the controller 100. FIG. 6 is a flowchart illustrating a flow of the control method S1 carried out by the controller 100 illustrated in FIG. 5.

As illustrated in FIG. 6, the control method S1 includes a synchronization process S11, a detection process S12, and a display process S15. Further, the control method S1 may include a determination process S13 and a notification process S14. The processes S11 to S14 are repeatedly carried out while the worker performs the processing. The display process S15 is carried out in parallel with the processes S11 to S14.

The synchronization process S11 is a process of synchronizing operation of the master robot 10 and operation of the slave robot 50 with each other. More specifically, the processor 101 of the controller 100 controls the first actuator 14 and the second actuator 54 so as to synchronize operation of the first link mechanism 11 and operation of the second link mechanism 51 with each other, in the synchronization process S11.

In the synchronization process S11, the processor 101 acquires information indicative of a rotation angle of the output shaft of the first actuator 14 from the master controller 20. The processor 101 transmits a command signal to the slave controller 60 via the communication IF 104 so that a rotation angle of the output shaft of the second actuator 54 becomes the same angle as a rotation angle of the output shaft of the first actuator 14 which has been acquired.

In the synchronization process S11, the processor 101 acquires, via the communication IF 104, information indicative of the rotation angle of the output shaft of the second actuator 54 which has been fed back from the slave controller 60. In the synchronization process S11, the processor 101 transmits a command signal to the master controller 20 via the communication IF 104 so that the rotation angle of the output shaft of the second actuator 54 which has been fed back and the rotation angle of the output shaft of the first actuator 14 become the same angle. This enables the worker to, via the first tool 15, grasp the reaction force and/or the moment of the force acting on the target W from the second tool 55, as a sensation.

The detection process S12 is a process of, while the target W is being processed with use of the second tool 55, detecting a reaction force and/or a moment of a force acting on the target W with use of the force sensor 80. In the detection process S12, the processor 101 acquires information indicative of a value(s) of the reaction force and/or the moment of the force acting on the target W which have been detected by the force sensor 80, from the slave controller 60 via the communication IF 104. In addition, in the detection process S12, an angular velocity of the second tool 55 may be detected by the angular velocity sensor 58. In the detection process S12, the processor 101 may acquire, from the angular velocity sensor 58, information indicative of a value of the angular velocity of the second tool 55 which has been detected by the angular velocity sensor 58.

The determination process S13 is a process of determining whether or not the parameter(s) detected by the force sensor 80 exceed a threshold(s). The processor 101 determines whether or not the value(s) of the reaction force and/or the moment from the force sensor 80 which have been acquired in the detection process S12 are larger than a threshold(s).

The notification process S14 is a process of notifying the worker that the parameter(s) that have been detected by the force sensor 80 are value(s) larger than the threshold(s). In a case where the value(s) of the reaction force and/or the moment which have been detected by the force sensor 80 are determined to be larger than the threshold(s) in the determination process S13, the processor 101, in the notification process S14, notifies the worker that the value(s) of the reaction force and/or the moment which have been detected by the force sensor 80 have exceeded the threshold(s). The threshold(s) may be a value(s) calculated through experiments or simulations or may be any value(s) set by the worker. In the notification process S14, the processor 101 performs the notification to the worker through a sense of hearing and/or a sense of sight. For example, the processor 101 may perform the notification to the worker by raising an alarm and/or display warning on the display 30.

According to the configuration of carrying out the notification process S14, the notification process S14 enables the worker to recognize that a force exceeding a threshold is being applied on the target W. This makes it possible to maintain quality of processing the target W.

The display process S15 is a process of, on the display 30, displaying force data indicative of the reaction force and/or the moment which have been detected by the force sensor 80. In the display process S15, the processor 101 generates a display screen for, on the display 30, displaying the value(s) of the reaction force and/or the moment from the force sensor 80 which have been acquired in the detection process S12. In the display process S15, the processor 101 outputs the generated display screen to the master controller 20 and transmits a command signal to the master controller 20 to cause the display 30 to display the outputted display screen.

In the display process S15, the processor 101 may generate a display screen for, on the display 30, displaying movement data indicative of a moving state of the second tool 55 based on one or both of an angular velocity which has been detected by the angular velocity sensor 58 and an acceleration which has been detected by the acceleration sensor 59. Further, in the display process S15, the processor 101 may generate a display screen for, on the display 30, displaying an image which shows a processed state of the target W and which has been captured by the camera 90.

Figure 7:
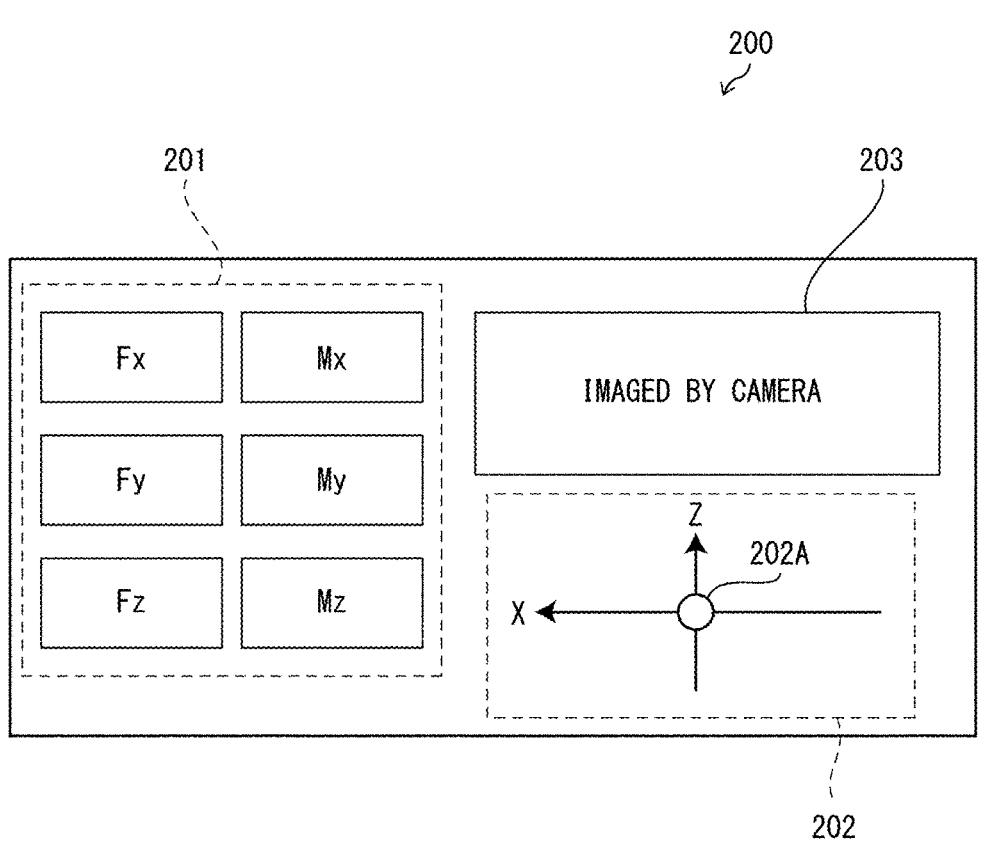
FIG. 7 is a view illustrating an example of a display screen displayed in a display process.

With reference to FIG. 7, the following description will discuss an example of a display screen 200 displayed on the display 30. FIG. 7 is a view illustrating an example of the display screen displayed in the display process S15. On the display screen 200 of the example illustrated in FIG. 7, displayed are: force data 201 indicative of a value(s) of the reaction force and/or the moment which have been detected by the force sensor 80; movement data 202 indicative of a moving state of the second tool 55 based on an angular velocity which has been detected by the angular velocity sensor 58 and an acceleration which has been detected by the acceleration sensor 59; and a camera image 203 which shows a processed state of the target W and which has been captured by the camera 90. Note that the force data 201, the movement data 202, and the camera image 203 may be displayed on different display screens.

On the display screen 200, the force data 201 is displayed on a left side. In the force data 201, values of loads in the X-axis direction, in the Y-axis direction, and in the Z-axis direction (Fx, Fy, Fz) which have been detected by the force sensor 80 are displayed in the sections corresponding to them, and values of moments about the X-axis direction, about the Y-axis direction, and about the Z-axis direction (Mx, My, Mz) are displayed on the sections corresponding to them. Note that in the force data 201, only values of the loads in the axis directions (Fx, Fy, Fz) may be displayed, or only a value of a load in the X-axis direction (Fx) may be displayed. Further, in the force data 201, a graph indicative of change over time in the force and/or the moment which have been detected by the force sensor 80 may be displayed.

On the display screen 200, the movement data 202 is displayed on a lower right side. In the movement data 202, a moving state of the second tool 55 in the X-axis direction and the Z-axis direction is displayed on the basis of an angular velocity which has been detected by the angular velocity sensor 58 and an acceleration which has been detected by the acceleration sensor 59. Note that in the movement data 202 on the display screen 200, a moving state of the second tool 55 based on an angular velocity which has been detected by the angular velocity sensor 58 or an acceleration which has been detected by the acceleration sensor 59 may be displayed.

In the movement data 202, displayed are coordinate axes indicative of the X-axis direction and the Z-axis direction and a pointer 202A indicative of a position of the second tool 55. On the display screen 200, when the pointer 202A is located at the zero point of the coordinate in the X-axis direction and at the zero point of the coordinate in the Z-axis direction, it is indicated that the second tool 55 is located at the default position. When the second tool 55 moves in the X-axis direction from the default position, the pointer 202A moves along the coordinate axis indicative of the X-axis direction, whereas when the second tool 55 moves in the Z-axis direction from the default position, the pointer 202A moves along the coordinate axis indicative of the Z-axis direction.

On the display screen 200, the camera image 203 is displayed on an upper right side. In the camera image 203, a still image captured by the camera 90 may be displayed or a moving image captured by the camera 90 may be displayed.

According to the configuration in which the processor 101 carries out a display process S5, force data indicative of a reaction force of a force acting on the target W which has been detected by the force sensor 80 is displayed on the display 30. This makes it possible to achieve the robot system 1 that enables a worker and the like to grasp, as data, a force actually acting on the target W. The worker is enabled to operate the first tool 15 on the basis of the force data 201 displayed on the display 30 in addition to a sensation of operating the first tool 15. Further, the displaying of the force data 201 on the display 30 enables a third person other than the worker operating the first tool 15 to recognize a condition of the processing work. This enables the worker to give instruction and teaching on the processing work for the third person on the basis of the force data 201 on the display 30.

In the display process S5, the movement data 202 is displayed on the basis of one or both of an angular velocity which has been detected by the angular velocity sensor 58 and an acceleration which has been detected by the acceleration sensor 59. Such a configuration enables the display 30 to, in a real-time manner, display the operation of the second tool 55 which has been detected by one or both of the angular velocity sensor 58 and the acceleration sensor 59. This enables the worker to check whether operation of the master robot 10 and operation of the slave robot 50 are being successfully synchronized with each other in a proper manner.

Further, the configuration of displaying the camera image 203 on the display 30 in the display process S15 enables the worker to check a processed state of the target W by an image which has been captured by the camera 90. This makes it possible to objectively check the processed state of the target W.

[Variation]

Figure 8:
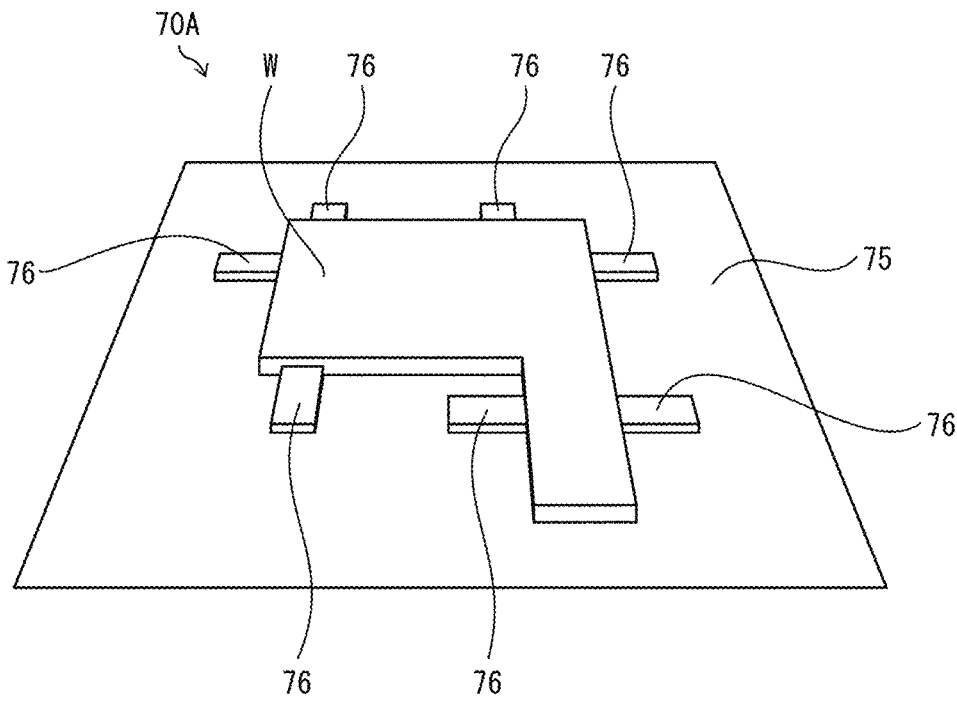
FIG. 8 is a perspective view illustrating an appearance of a variation of the fixing part of the robot system in accordance with Embodiment 1.
Figure 9:
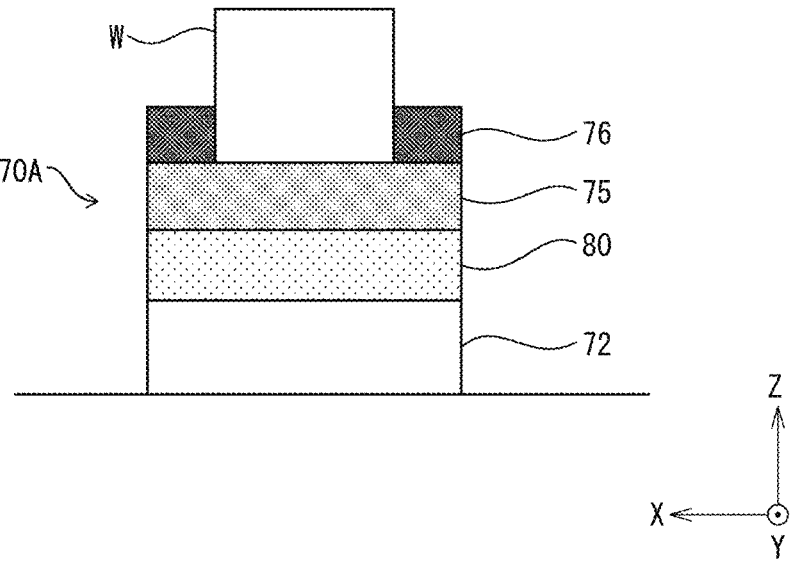
FIG. 9 is a schematic view illustrating a configuration of a fixing part illustrated in FIG. 8.

With reference to FIG. 8 and FIG. 9, the following description will discuss a variation of the fixing part 70 in accordance with Embodiment 1. FIG. 8 is a perspective view illustrating an appearance of the variation of the fixing part 70 of the robot system 1 in accordance with Embodiment 1. FIG. 9 is a schematic view illustrating a configuration of a fixing part 70A illustrated in FIG. 8. An aspect in which the target W is fixed by the vise 71 is described in the above embodiment, but a fixing part of the present disclosure is not limited to this. The fixing part 70A may include fixing members 76 configured to fix the target W. For convenience of description, a member having a function identical to that of a member discussed in the embodiment above is given an identical reference sign, and a description thereof is omitted.

As illustrated in FIG. 8, the target W is fixed on a fixing stage 75 with use of the fixing members 76 provided on the fixing stage 75. The fixing members 76 are a plurality of members which protrude upward from the fixing stage 75 and which are provided on the fixing stage 75. The plurality of fixing members 76 hold therebetween external surfaces of the target W in a horizontal direction, so that the target W is fixed on the fixing stage 75. As illustrated in FIG. 9, the fixing stage 75 is provided on the force sensor 80. The fixing stage 75 may be attached to the force sensor 80 with use of, for example, bolts. The force sensor 80 detects, via the fixing stage 75, a reaction force and a moment of a force acting on the target W from the second tool 55.

OTHER EMBODIMENTS

The above embodiment describes the robot system 1 that carries out a filing process on the target W, but the robot system 1 of the present disclosure is not limited to such a configuration. Examples of a process that can be carried out by the robot system 1 of the present disclosure include a grinding process using a grinder, a cutting process using a saw, a process of smoothening a surface using a plane, or a piercing process using a gimlet.

Further, the first link mechanism 11 and the second link mechanism 51 are each a parallel link mechanism in the above embodiment but are not limited to such a configuration. The first link mechanism 11 and the second link mechanism 51 may be each a serial link mechanism. Alternatively, the first link mechanism 11 and the second link mechanism 51 may be each a linear-motion link mechanism which linearly moves in the X-axis direction.

Further, each fixing part 70 and 70A includes the single force sensor 80 in the above embodiment, but each fixing part 70 and 70A may have a configuration of including a plurality of force sensors 80. For example, each fixing part 70 and 70A may include a force plate including the plurality of force sensors 80. On the force plate, the vise 71 and the like may be provided. According to such a configuration, when the target W is processed, a distribution of a force applied to the target W can be displayed on the display screen. This makes it possible to grasp a more detailed force distribution actually acting on the target W.

Further, the force sensor 80 is configured to be provided to each fixing part 70 and 70A in the above embodiment but is not limited to such a configuration. The force sensor 80 may be provided to the second tool 55. In this case, the force sensor 80 detects, via the second tool 55, a reaction force and a moment of the force acting on the target W from the second tool 55.

Further, the force data 201, the movement data 202, and the camera image 203 are displayed on the same display screen 200 in the above embodiment but are not limited to such a configuration. The force data 201, the movement data 202, and the camera image 203 may be displayed on different display screens. Further, the robot system 1 may include either the angular velocity sensor 58 or the acceleration sensor 59, and in the movement data 202, displayed may be a moving state of the second tool 55 based on either an angular velocity which has been detected by the angular velocity sensor 58 or an acceleration which has been detected by the acceleration sensor 59.

Aspects of the present invention can also be expressed as follows:

A robot system in accordance with Aspect 1 of the present disclosure includes: a master robot including a first link mechanism and a first tool that is coupled to the first link mechanism and that is operated by a worker; a slave robot including a second link mechanism that operates mutually in synchronization with the first link mechanism and a second tool that is coupled to the second link mechanism and that is driven by the second link mechanism; a force sensor that detects a reaction force of a force acting on a target from the second tool; a display; and a controller, the controller being configured to carry out a display process of, on the display, displaying force data indicative of the reaction force which has been detected by the force sensor.

According to the configuration of Aspect 1, force data indicative of a reaction force of a force acting on the target which has been detected by the force sensor is displayed on the display. This makes it possible to achieve a robot system that enables a worker and the like to grasp, as data, a force actually acting on the target.

A robot system in accordance with Aspect 2 of the present disclosure, in Aspect 1 above, further includes a fixing part that fixes the target to be processed by the second tool, the fixing part including the force sensor.

According to the configuration of the Aspect 2, a reaction force of a force acting on the target from the second tool is transferred to the fixing part. The force sensor can detect the reaction force which has been transferred to the fixing part. The force sensor can, when provided on a fixing part side, more accurately detect the reaction force of the force acting on the target than when provided on a second tool side. This makes it possible to accurately detect the reaction force of the force acting on the target from the second tool.

A robot system in accordance with Aspect 3 of the present disclosure, in Aspect 1 or 2 above, further includes one or both of an angular velocity sensor that detects an angular velocity of the second tool and an acceleration sensor that detects an acceleration of the second tool, the controller being configured to, on the display, display the force data and movement data indicative of a moving state of the second tool based on one or both of an angular velocity which has been detected by the angular velocity sensor and an acceleration which has been detected by the acceleration sensor.

The configuration of Aspect 3 enables the display to, in a real-time manner, display the operation of the second tool which has been detected by one or both of the angular velocity sensor and the acceleration sensor. This enables the worker to check whether operation of the master robot and operation of the slave robot are being successfully synchronized with each other in a proper manner.

A robot system in accordance with Aspect 4 of the present disclosure, in any one of Aspects 1 to 3 above, further includes a camera that images a processed state of the target, the controller being configured to, on the display, display the force data and an image which shows the processed state and which has been captured by the camera.

The configuration of Aspect 4 enables the worker to check the processed state of the target by the image which has been captured by the camera. This makes it possible to objectively check the processed state of the target.

A robot system in accordance with Aspect 5 of the present disclosure is configured, in any one of Aspects 1 to 4 above, such that the controller further carries out a notification process of notifying one or both of the worker and another worker that a force which has been detected by the force sensor has a value larger than a threshold.

According to the configuration of Aspect 5, the notification process enables the worker to recognize that a force exceeding a threshold is being applied to the target. This makes it possible to maintain quality of processing the target.

A controller in accordance with Aspect 6 of the present disclosure is a controller configured to control a robot system including: a master robot including a first link mechanism and a first tool that is coupled to the first link mechanism and that is operated by a worker; a slave robot including a second link mechanism that operates mutually in synchronization with the first link mechanism and a second tool that is coupled to the second link mechanism and that is driven by the second link mechanism; a force sensor that detects a reaction force of a force acting on a target from the second tool; and a display, the controller being configured to carry out a display process of, on the display, displaying force data indicative of the reaction force which has been detected by the force sensor.

A method for controlling a robot system in accordance with Aspect 7 of the present disclosure is a method for controlling a robot system including: a master robot including a first link mechanism and a first tool that is coupled to the first link mechanism and that is operated by a worker; a slave robot including a second link mechanism that operates mutually in synchronization with the first link mechanism and a second tool that is coupled to the second link mechanism and that is driven by the second link mechanism; a force sensor that detects a reaction force of a force acting on a target from the second tool; and a display, the method including carrying out a display process of, on the display, displaying force data indicative of the reaction force which has been detected by the force sensor.

[Additional Remarks]

The present disclosure is not limited to the embodiments above, but can be altered by a skilled person in the art within the scope of the claims. The present disclosure also encompasses, in its technical scope, any embodiment derived by combining technical means disclosed in differing embodiments as appropriate.

The invention claimed is:

1. A robot system comprising:
   a master robot including
      a first link mechanism and
      a first tool that is coupled to the first link mechanism and that is operated by a worker;
   a slave robot including
      a second link mechanism that operates mutually in synchronization with the first link mechanism and a second tool that is coupled to the second link mechanism and that is driven by the second link mechanism;
   a fixing part that includes a vise holding a target to be processed by the second tool and a force sensor attached on the vise in such a manner that the force sensor detects, via the vise, a reaction force of a frictional force acting on the target from the second tool;
   a display; and
   a controller,
      the controller being configured to carry out a display process of, on the display, displaying force data indicative of the detected reaction force.

2. The robot system according to claim 1, further comprising one or both of an angular velocity sensor that detects an angular velocity of the second tool and an acceleration sensor that detects an acceleration of the second tool,
   the controller being configured to, on the display, display the force data and movement data indicative of a moving state of the second tool based on one or both of an angular velocity which has been detected by the angular velocity sensor and an acceleration which has been detected by the acceleration sensor.

3. The robot system according to claim 1, further comprising a camera that images a processed state of the target,
   the controller being configured to, on the display, display the force data and an image which shows the processed state and which has been captured by the camera.

4. The robot system according to claim 1, wherein the controller further carries out a notification process of notifying one or both of the worker and another worker that a force which has been detected by the force sensor has a value larger than a threshold.

5. A controller configured to control a robot system including: a master robot including a first link mechanism and a first tool that is coupled to the first link mechanism and that is operated by a worker; a slave robot including a second link mechanism that operates mutually in synchronization with the first link mechanism and a second tool that is coupled to the second link mechanism and that is driven by the second link mechanism; a fixing part that includes a vise holding a target to be processed by the second tool and a force sensor attached on the vise in such a manner that the force sensor detects, via the vise, a reaction force of a frictional force acting on the target from the second tool; and a display,
   the controller being configured to carry out a display process of, on the display, displaying force data indicative of the detected reaction force which has been detected by the force sensor.

6. A method for controlling a robot system including: a master robot including a first link mechanism and a first tool that is coupled to the first link mechanism and that is operated by a worker; a slave robot including a second link mechanism that operates mutually in synchronization with the first link mechanism and a second tool that is coupled to the second link mechanism and that is driven by the second link mechanism; a fixing part that includes a vise holding a target to be processed by the second tool and a force sensor attached on the vise in such a manner that the force sensor detects, via the vise, a reaction force of a frictional force acting on the target from the second tool; and a display, the method comprising carrying out a display process of, on the display, displaying force data indicative of the detected reaction force.

* * * * *